Feb. 10, 1970 J. A. PAPPALARDO ET AL 3,494,779

OXYGEN-DOMINATED PHOSPHOR FILMS

Filed Sept. 29, 1965 4 Sheets-Sheet 1

INVENTORS
JOSEPH A. PAPPALARDO &
MACLIN S. HALL
BY Louis A. Kline
Armand G. Morin Sr.
THEIR ATTORNEYS

OXYGEN-DOMINATED PHOSPHOR FILMS

Filed Sept. 29, 1965 4 Sheets-Sheet 2

INVENTORS
JOSEPH A. PAPPALARDO &
MACLIN S. HALL
BY Louis A. Kline
Armand G. Morin Sr.
THEIR ATTORNEYS

OXYGEN-DOMINATED PHOSPHOR FILMS

Filed Sept. 29, 1965 4 Sheets-Sheet 3

INVENTORS
JOSEPH A. PAPPALARDO &
MACLIN S. HALL
BY Louis A. Kline
Armand G. Morin Sr.
THEIR ATTORNEYS INVENTORS
JOSEPH A. PAPPALARDO &
MACLIN S. HALL
BY Louis A. Kline
Raymond G. Morin Sr.
THEIR ATTORNEYS

United States Patent Office 3,494,779
Patented Feb. 10, 1970

3,494,779
OXYGEN-DOMINATED PHOSPHOR FILMS
Joseph A. Pappalardo, Kettering, and Maclin S. Hall, Dayton, Ohio, assignors to The National Cash Register Company, Dayton, Ohio, a corporation of Maryland
Filed Sept. 29, 1965, Ser. No. 491,367
Int. Cl. B44d *1/08, 1/46*
U.S. Cl. 117—33.5 19 Claims

ABSTRACT OF THE DISCLOSURE

The present disclosure is directed to a process for making adherent oxygen-containing thin phosphor films of uniform thickness (particularly oxygen-dominated phosphors) on heat-resistant substrates by spraying a solution(s) of one or more compounds onto a substrate previously heated to a temperature between 350 and 850 degrees Fahrenheit, preferably between 450 and 650 degrees Fahrenheit, the compounds providing an adherent oxygen-containing thin film by thermal decomposition at the substrate temperature) then post-heat-treating the deposited film at between 1000 and 2500 degrees Fahrenheit for a period ranging from 10 minutes to 8 hours, preferably between 1600 and 2300 degrees Fahrenheit for ½-hour to 2 hours. The film-forming solutions contain all the necessary compounds or components for making a given oxygen-dominated film. Therefore, the finished film essentially contains no elements or ingredients extracted from the substrate.

The present invention relates to a process for the preparation of oxygen-containing inorganic (thin) films and screens, and to products produced therewith. More particularly, the invention broadly relates to methods for making oxygen-containing inorganic films, and especially oxygen-dominated luminescent films and screens, known in the art as "phosphors" and "phosphor screens," by spraying a heated substrate with a preferably aqueous solution of one or more chemical compounds to form a uniform film on said substrate in which all the elements forming the film are derived from the compounds dissolved in the sprayed solution.

Heretofore, very few methods have been found suitable for making oxygen-dominated films, some of which prior-art films possess luminescent properties and others of which possess electroconductive properties, such as the well-known tin oxide films.

A well-known prior-art process for making such oxygen-containing materials in the form of films is an evaporation process, such as that disclosed in an article by C. Feldman and M. O'Hara, entitled "Formation of Luminescent Films by Evaporation," J. Opt. Soc. Am. 47, 300 (1957). This process may be thought of as a two-step process in which a commercial phosphor material, usually in the form of phosphor powder, either with or without activators, is evaporated, under vacuum, onto a substrate in the form of a thin film or layer, and the latter is then fired in an appropriate atmosphere and temperature in order to reconstruct the crystalline phosphor. Although the evaporation process has had some measure of success, a number of disadvantages are apparent. The more obvious and important ones are (1) dissociation of the crystal upon heating may provide a deposit or film which departs from desired stoichiometry, (2) selective and non-uniform evaporation of the phosphor impurities may cause loss of the activator center, and (3) the phosphor deposit may be amorphous or exhibit a crystalline form which is different from that of the original phosphor.

Another method for making phosphor films is the vapor reaction method, such as that disclosed by F. J.

Studer and D. A. Cusano, J. Opt. Soc. Am. 45, 493 (1955). In this method, vapors or gases containing the elements desired in the finished film are allowed to react on a suitably heated and nucleated substrate. Strict control requirements for concentration of reactants, vapor pressure of the reactants, freshness of vapor mixture, etc., are mandatory with this process.

In still another prior-art method, Kirk and Schulman, J. Electrochem. Soc. 108, 455 (1961), describe the process of preparing transparent luminescent films of zinc and cadmium silicate phosphors by spraying solutions of zinc chloride or cadmium iodide containing desired activators onto silica or Pyrex glass preheated to 850 to 1000 degrees Centigrade. In this process, the phosphor is formed by the reaction of the zinc or cadmium, present as cations in solution, with silicate derived from the supporting glass substrate. In sharp contrast to the prior-art method of Kirk and Schulman for making silicate phosphors, the present invention prevides a method for making such silicate phosphors whereby all the elements needed to make the film are contained in the sprayed solution.

No reaction with the glass substrate is required to provide the silica contained in the silicate portion of the phosphor. Thus, the present invention is adapted for making silicate phosphors not only on glass or silica substrates but also on other heat-resistant substrates, such as metals, ceramics, graphite, etc., in which combination the silicate must, of necessity, originate in the sprayed solution.

The novel process of the invention is related to the spray process for making photoconductive and luminescent sulfide and selenide films described and claimed in the commonly-assigned U.S. Patent No. 3,148,084, issued to James E. Hill and Rhodes R. Chamberlin on Sept. 8, 1964, but only in so far as it embraces or relates to atomizing or spraying a solution onto a heated substrate for forming a film of desired characteristics. With the exception of the spraying apparatus and the heating means, the specific conditions, solutions, and materials required in the novel process for making oxygen-containing films form no part of the disclosure in said Hill et al. United States patent. The invention described and claimed in the said patent is limited to the process and the materials for making sulfide, selenide, and related semiconductive films, more particularly photoconductive and luminescent sulfide and selenide films, whereas the present invention is directed to the process and the materials for making oxygen-dominated films, preferably oxygen-dominated phosphors.

The spray nozzle, the heating means, and the associated apparatus described in the above-mentioned Hill and Chamberlin United States patent are entirely suitable for spraying the solutions useful for making the films of the present invention. Alternatively, other conventional spraying apparatus and heating means may be utilized. For example, for improved film uniformity, the spray may be directed through a motor-driven oscillating spray nozzle.

The present invention is particularly concerned with a novel, highly effective, and advantageous process for making high-resolution adherent phosphor films and other oxygen-dominated films, and it consists of spraying a solution of specific compounds for each desired type of film onto a suitably-heated substrate. A further step of baking or post-heat-treatment is generally required to obtain optimum luminescent properties of photo- and/or cathodo-luminescent films.

The process and the materials of the present invention have been found to be uniquely adapted for making photo- and/or cathodo-luminescent phosphor films of large area. The most common method for making phosphor screens consists of settling onto a substrate a dispersion of preformed phosphor particles from a solution containing a binder. It is known that screens prepared by this prior-art method have adequate luminous efficiency, but they leave much to be desired with respect to image resolution, electron burn resistance, and adherence to substrate.

The present invention, however, overcomes the above and other prior-art disadvantages by providing a process and materials to be used therewith which (1) provide a most economical and universally applicable method for making phosphor films, wherein the percentage composition of the film is more easily controlled within narrow limits in this process than in any of the prior-art methods of powder deposition, vapor reaction, and evaporation; (2) provides a film consisting of homogenenously-dispersed components; (3) greatly simplifies the homogeneous incorporation of carefully-measured quantities of activators and coactivators; (4) provides homogeneous solutions of normally difficult to dissolve phosphor-film-forming compounds in sufficient concentration for making solution spraying a practical method of making phosphor films; (5) provides an extremely simple method, compared to prior-art methods, for reproduceably making phosphor and other oxygen-containing films having highly uniform characteristics, whether the film area is large or small; (6) provides films ranging from opaque to transparent, such films being readily made by varying such parameters as rate and time of spray, the concentration of ingredients, and substrate temperature; (7) provides a process readily adaptable for automatic continuous production of either large or small area phosphor films having improved image resolution and high resistance to electron burn; (8) requires no vacuum apparatus; (9) provides films having excellent adherence to substrates such as quartz, glass, mica, and ceramics, as well as acceptable adherence to metal surfaces; and (10) provides easy control of film thickness.

Some of the advantages of luminescent films over luminescent powder screens have been disclosed in the literature. For example, advantages of transparent films appear in the article by C. Feldman and M. O'Hara, mentioned hereinabove; it also discloses the making of such films by vacuum evaporation. It should be noted, however, that such advantages, as well as others stated herein, inhere in films made by the instant novel process. Nothwithstanding, this process provides such unique characteristics listed as (1) to (10) inclusive above, and none of the major disadvantages, of the prior-art evaporation and vapor reaction phosphor film processes.

Although the invention is primarily directed to the process of forming oxygen-dominated phosphor films, essentially the same process, with the exception of the solution to be sprayed, is well adapted for making metal oxide films having diversified uses, such as, for example, $TiO_2$, $Al_2O_3$, and SnO films. Prior-art methods for making such films by spraying a solution of a metal, such as a metal halide solution, onto a heated substrate are known, and, accordingly, there is no intent to include such films or method of making them within the scope of either the specification or the claims of the present application.

One such prior-art method for making a variety of metal oxide films is disclosed in U.S. Patent No. 3,087,831, issued to Charles M. Browne on Apr. 30, 1963.

As alluded to above, films ranging from opaque (frosty) to transparent may be made by the method of the invention by controlling such process variables as spray solution composition, substrate material, spray rate, substrate temperature during spray, heat treatment, heat treatment time, and heat treatment atmosphere. Control of the amount of light scattering in a film is important, since the image resolution capabilities of the film are directly related to the amount of volume-scattering within the phosphor film. It is known that, in a clear transparent film, a physical state indicating little or no scattering of light, a large fraction of luminescent emission is internally trapped and piped to the edge of the film, where it serves no purpose, whereas an excessive amount of surface and/or volume-scattering seriously degrades film resolution.

It will be seen that, by use of the present invention, image resolution, an extremely important phosphor film characteristic, is readily controlled to the end that optimum resolution for a given film is obtainable without excessively sacrificing luminescent output.

The film-forming solutions of the invention contain all the necessary compounds, or components for making a given oxygen-dominated film. Therefore, the finished film essentially contains no elements or ingredients extracted from the substrate.

Preferably, the necessary compounds or components, which ultimately provide the oxygen-dominated film, form true solutions in the liquid spray vehicle or solvent, or they are distributed therein as sub-colloidal particles. It is preferred that the solution which is sprayed in the process of making oxygen-dominated films contain the cation the anion, and, when included, the activator portions or moieties of the film, as free ions, or, alternatively, the respective film-forming moieties may be in the form of compounds or ions which thermally decompose to such film ions at the substrate temperatures. Irrespective of their exact compositions or by what name they are identified, such compounds or ions which are thermally decomposed or rearranged during the film-forming process are, in fact, precursors of the resulting film composition and structure.

These compounds which are dissolved in the spray solution and which include or are thermally decomposed to the respective film ionic portions and activator portions may, for convenience and consistency, be hereinafter referred to as:

(a) cation precursor(s)
(b) anion precursor(s)
(c) activator precursor(s)

As examples of key elements contained in such precursor compounds a, b, and c, there may be mentioned the following elements selected from the periodic chart of the elements printed in the Handbook of Chemistry and Physics, pages 448 and 449, Forty-First Edition, Chemical Rubber Publishing Company, Cleveland, Ohio, United States of America:

(a) Be, Mg, Ca, Sr, and Ba from Group II–A;
Zn, Cd, and Hg from Group II–B;
Sc, Y, La from Group III–B;
(b) Si, Ge, and Sn from Group IV–A;
Ti, Zr, and Hf from Group IV–B;
V, Nb, and Ta from Group V–B;
P, As, and Sb from Group V–A; S from Group V–A;
Cr, Mo, and W from Group VI–B;
B, Al, Ga, and In from Group III–A; and
(c) Cu, Ag, Mn, Pb, Ce, Sm, Eu, and other rare earths.

As a further illustration of precursor compounds, a $Zn_2SiO_4 \cdot Mn$ luminescent film is conveniently made by spraying a solution containing suitable proportions of (a) zinc acetate, (b) tetraethylorthosilicate, and (c) manganese acetate.

In this embodiment, the cationic Zn, anionic $SiO_4$, and Mn activator portions of the said film are derived from or originate with the respective precursor compounds (a), (b), and (c) specified above.

It is clear from the foregoing, and from embodiments set forth below, that a film of predetermined composition is formed on a suitably heated substrate at the instant the spray droplets strike the substrate.

The present invention consists of an improved method for making oxygen-containing thin films, which method comprises exposing an atomized solution containing the ions or ion precursors necessary to form a film of desired composition to a suitably heated substrate in a manner which simultaneously evaporates the volatile solvent and volatile decomposition products and deposits the desired essentially non-volatile film in a strongly adherent manner on the substrate.

The composition of the spray solution varies, of course, depending on the film composition being prepared. Some films are prepared without activator ions or elements, whereas others are prepared with one or more activators and/or coactivators.

Generally, the spray solution is prepared so that the various film-forming precursor compounds dissolved therein are compatible with each other as well as with the solvent system (will not precipitate or agglomerate).

It should be noted that in many instances it is possible to provide a desired phosphor film by the spray process because a compatible combination of soluble precursors has been found. The precursor concentration in a given spray solution is somewhat dependent on the type of phosphor, the rate of spray, the film thickness, etc. However, considerable latitude is permissible with regard to concentrations of the various precursors. From a practical standpoint, the precursor concentration is great enough so that the spray time required for a given film thickness is not excessive, yet small enough that the solubility and compatibility limits are not exceeded.

It has been found that a large number of cation, anion, and activator precursors are available and suitable for making many phosphors by the process described herein.

In the process of making some phosphors by the spray method, however, it is difficult to find the right precursors which, in combination, are sufficiently soluble in a selected solvent vehicle to provide a compatible spray solution. It is desirable, furthermore, that such precursors be sufficiently soluble in the chosen solvent system to provide a spray solution concentration sufficiently high to permit the making of a suitable film in a reasonable time. Alternatively, in some instances, films may be made by cospraying separate solutions where a single solution of the required precursors would result in precipitation or incompatibility of spray solution components.

To illustrate, Examples 6 and 7, set forth below, disclose solutions in which the precursors and the solvent system have been carefully selected in order to provide a spray solution in which there is little or no precipitating or agglomerating action between the cation and anion moieties of the dissolved precursors. Similarly, Example 19 illustrates a compatible spray solution which comprises barium and lead cations obtained by dissolving barium and lead containing precursors in a solvent vehicle of water and methanol. It will be clear from this example that barium, lead, and a sulfate ion moiety are shown to co-exist in a particular solvent vehicle without the precipitation of barium and lead products. As is known, such ions normally form precipitates in many aqueous systems.

As stated previously, considerable latitude in the concentration of dissolved precursors is permissible. Generally, the concentration of the cation precursor is adjusted to be between .01 and .1 molar, and the preferred range is between .01 and .05 molar; the concentration of the anion precursor varies from .005 to .10 molar, preferably between .005 and .05 molar; and, when an activator is used in the spray solution, the concentration of the activator precursor is generally between .0001 and .003 molar. When one precursor serves as a combined source of both cation and anion in the resultant film (as with $CdSO_4$); the concentration thereof used can be additive as regards the aforementioned separately stated concentrations for cation and anion precursors. Hence, from .015 to .2 molar $CdSO_4$ can be used.

Thousands of oxygen-containing films of different compositions, particularly oxygen-dominated luminescent films, have been prepared by the various methods known to the art. Obviously, because of the great diversity of such films and because of the great effort required for their preparation, only a relatively small number have been made by the process of the instant invention. However, it should be understood that the herein-defined process is not only excellently suited for making the films specified herein, but also excellently suited for making any oxygen-containing film, particularly oxygen-dominated phosphor films, such as, for example, the phosphors disclosed in Leverenz, H. W., Introduction to the Luminescence of Solids, John Wiley & Sons, Inc., New York, N.Y., United States of America (1950), as well as other specialized films containing oxygen.

Essentially, any oxygen-containing film can be made by the present process for which a compatible solution of the above-mentioned precursors (a), (b), and (c) can be formulated.

Generally, an aqueous solvent system is preferred, since the presence of water lowers the solution volatility and allows the preparation of more uniform film characteristics, particularly with large-area films. The aqueous solution may contain water-miscible diluents, even in major proportion. The usual water-miscible diluents are weak organic acids, lower-molecular-weight alcohols, ammonia, etc. The choice of diluents is not critical; the diluents and the proportions thereof are so chosen as to provide a true solution when combined with the selected film precursors.

Accordingly, a prime object of the present invention is the provision of a process for making adherent oxygen-containing thin films, particularly oxygen-dominated phosphors, on heat-resistant substrates, the process consisting essentially of spraying a solution of one or more compounds onto a heated substrate, the compounds providing an adherent oxygen-containing thin film by thermal decomposition at the substrate temperature, then post-heat-treating the deposited film at between 1000 and 2500 degrees Fahrenheit for a period ranging from ten minutes to eight hours, preferably between 1600 degrees Fahrenheit and 2300 degrees Fahrenheit for one half-hour to two hours.

Other objects and advantages of the present invention may best be understood by reference to the following more particular description of preferred embodiments of the invention, taken together with the accompanying drawings, wherein.

Figure 1:
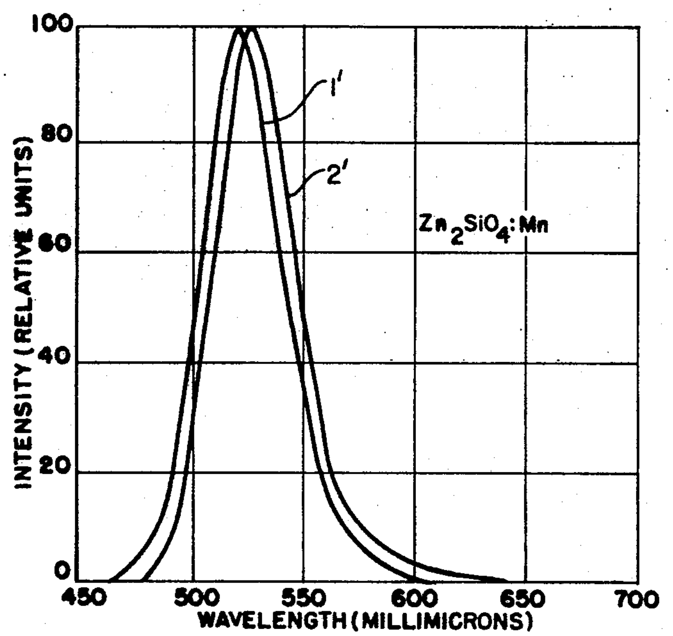
FIGS. 1 and 2 show the emission spectra of $ZnSiO_4$:$M_n$ and zinc and cadmium tungstate phosphor thin films, respectively.

Referring to FIG. 1, there are depicted curves 1′ and 2, representing the photoluminescent emission spectra of $Zn_2SiO_4 \cdot Mn$ Phosphors. Curve 1′ depicts the emission of a sprayed film according to Example 1 herein, and curve 2′ depicts the emission of a corresponding prior-art $Zn_2SiO_4 \cdot Mn$ screen prepared by the powder method. The close agreement between the curves is apparent.

Figure 2:
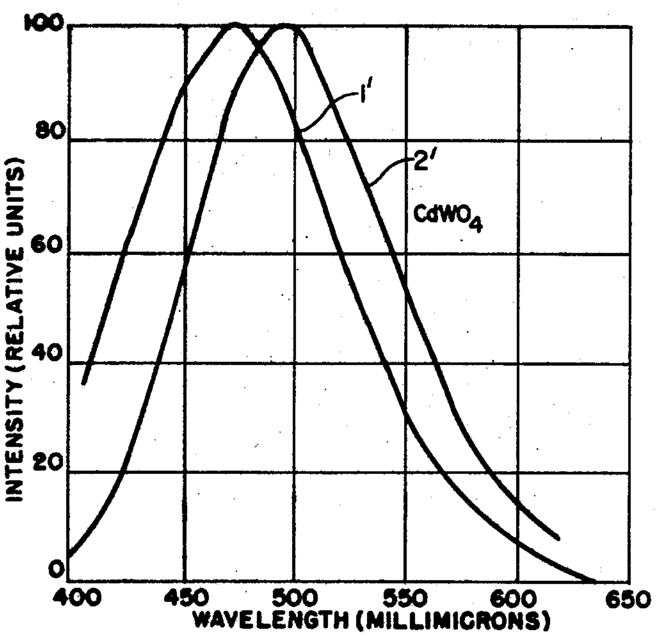

FIG. 2 illustrates the luminescent emission spectra of a sprayed $CdWO_4$ film as curve 1′ and the corresponding spectra of a prior-art powder $CdWO_4$ screen as curve 2′. The film of curve 1′ is prepared as shown in Example 7 herein.

Figure 3:
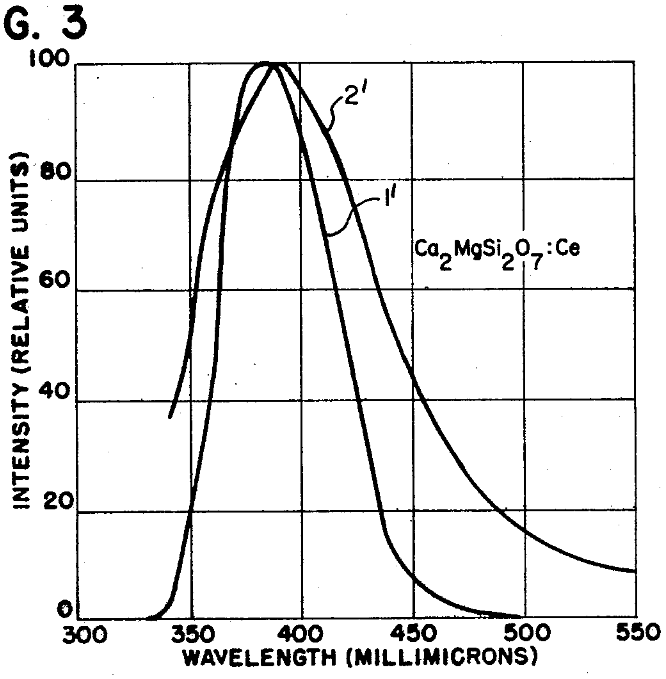
FIG. 3 illustrates the emission spectrum of P–16 phosphor.

In FIG. 3, curve 1′ represents the cathodoluminescent spectra of a sprayed P–16 phosphor film of the formula $Ca_2MgSi_2O_7$:Ce; curve 2′ illustrates the emission spectra of a corresponding $Ca_2MgSi_2O_7$:Ce (P–16) screen prepared by the powder method.

Figures 4, 5:
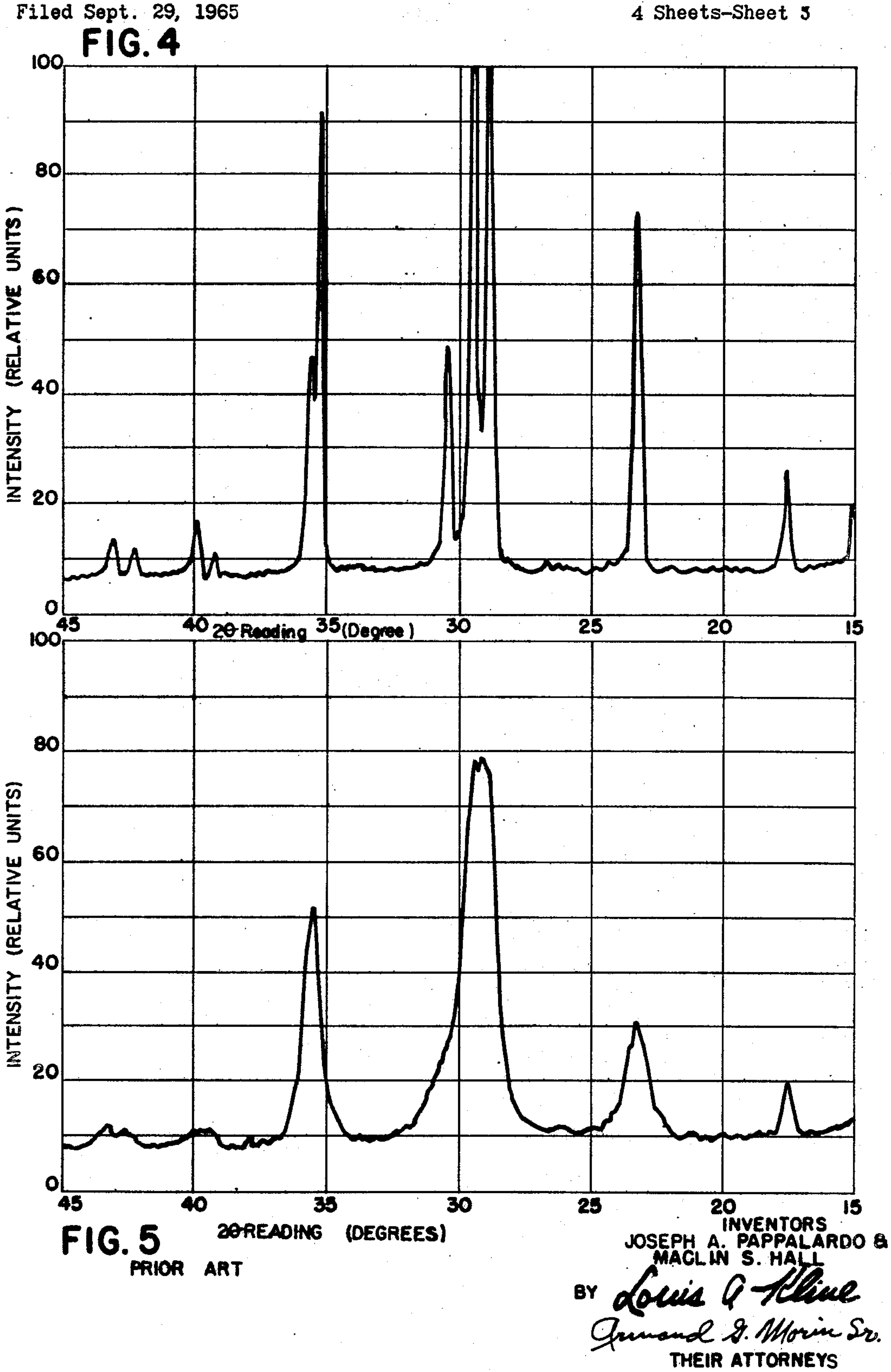
FIG. 4, FIG. 5 PRIOR ART
FIGS. 4 and 5 illustrates, respectively, the X-ray diffraction patterns of (1) a sprayed $CdWO_4$ phosphor film and (2) a $CdWO_4$ phosphor made from commercial phosphor powder.

FIGS. 4 and 5 illustrate X-ray diffraction patterns of $CdWO_4$ phosphors. The pattern of FIG. 4 was obtained with the sprayed $CdWO_4$ film used for obtaining curve 1 of FIG. 2, whereas the pattern of FIG. 5 was obtained with the corresponding $CdWO_4$ prior-art phosphor powder used for obtaining curve 2' of FIG. 2.

The separation and the sharpness and height of the peaks shown in the sprayed film pattern of FIG. 4 is strong evidence that the sprayed film of the invention has a higher degree of crystallinity than the prior-art $CdWO_4$ phosphor made by the powder method. Note that the $2\theta=29$ peak for the powder screen of FIG. 5 is resolved into three distinct peaks for the sprayed film of FIG. 4.

As previously mentioned, phosphor films produced by the novel process of the present invention are superior to prior-art powder phosphors with respect, at least, to (1) resistance to electron burn, (2) higher resolution, and (3) improved adherence to the substrate. In some respects, however, it is desired that phosphors produced according to the instant invention bear a close relation to prior-art phosphors. For example, specific phosphor characteristics, such as spectral emission, are generally correlated with the phosphor chemical composition. Hence, the chemical composition of the novel sprayed phosphors is similar to that of corresponding phosphor powders or films prepared by conventional methods. Thus, FIGS. 1 to 5, inclusive, serve to illustrate the similarity, with respect to specified characteristics, between representative sprayed phosphor films of the invention and the corresponding prior-art phosphors.

Figure 6:
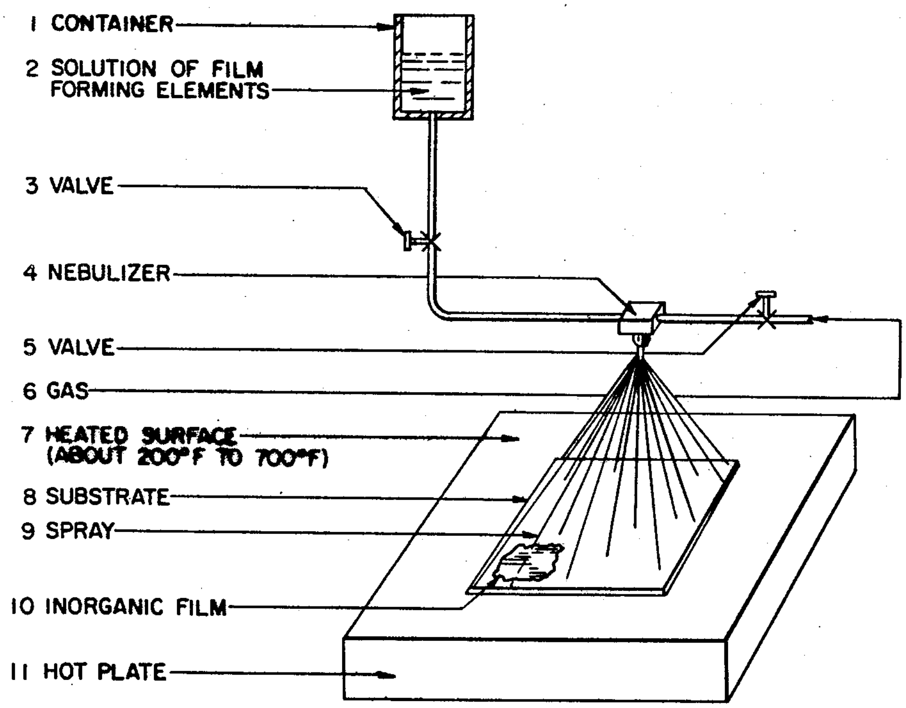
FIG. 6 is a diagrammatic representation of one form of the spraying apparatus and associated heating means useful for making the films of the present invention.

Referring now to FIG. 6, there is shown, diagrammatically, one form of apparatus suitable for carrying out the process of the invention. The solution 2 to be sprayed, having dissolved therein the film precursor compounds which include all the elements for synthesizing the desired film, is placed in a container 1 and fed to a nebulizer or spray head 4 through a connecting tube. The rate of solution flow between the container 1 and the spray head 4 is controlled in a gravity feed system, as shown in the figure, by the operating valve 3. The solution is vaporized in the spray head 4 with the aid of gas which is fed therein under pressure through a tube 6. The gas pressure is controlled by a valve 5, inserted between the spray head 4 and the source of gas.

In operation, a surface 8 to be coated is placed on a hot plate 11 and heated to a desired temperature by conduction from a heated surface 7. When the highly-atomized spray 9 strikes the heated substrate 8, an adherent oxygen-containing film 10 is formed thereon by chemical reaction between the dissolved film-forming precursors. The reaction takes place on the surface of the substrate 8 when the required heat gradient is maintained between the said substrate 8 and the surface 7 of the hot plate 11.

Certain obvious apparatus modifications, such as the use of a movable or oscillating spray head, multiple spray heads, and separate solutions being fed to and only mixed at the spray head could, under specific circumstances, improve film preparation and, hence, are to be considered as within the present disclosure.

Generally, oxygen-containing films of the present invention are prepared by spraying a substrate maintained at a temperature between 350 and 850 degrees Fahrenheit, preferably between 450 and 650 degrees Fahrenheit.

The spray rate is not critical and may vary from about 200 ml. per hour to 600 ml. per hour. The preferred rate is normally about 400 ml. per hour. It has been found that a practical spray rate is partly determined by the heat conductivity of the substrate, by the hot plate temperature, and by the temperature differential between the two. Generally, the greater the heat conductivity of the substrate, the smaller the thermal gradient between the surface of the substrate and the hot plate. In any event, the spray rate and the hot plate temperature are adjusted so as to maintain the substrate surface temperature between 350 and 850 degrees Fahrenheit.

In making certain phosphors, it is advantageous to intermittently spray the solution on the heated substrate. A generally suitable time cycle is three off to one on. The off-to-on time may, of course, be varied, depending on the film, the substrate, etc. The off time provides a period during which the film is oxidized, and, further, it aids in maintaining the desired substrate temperature.

The main function of the gas which is fed through the tube 6 to the spray head 4 is to develop and maintain a controlled pressure drop at the spray head and to atomize the liquid. Air is usually utilized for this purpose; however, other gases, such as nitrogen, carbon dioxide, the inert gases, etc., are also suitable. These gases are to be distinguished, however, from the gases normally used in baking or post-heat-treating and already-deposited film. In baking, the film is raised to a temperature higher than that at which it is formed, usually from about 1000 to 2500 degrees Fahrenheit, and the atmosphere may be nitrogen, air, or oxygen. The use of air and oxygen is preferred. As stated above, best results are obtained by baking the films in an atmosphere of air or oxygen for ten minutes to eight hours, preferably from about one half-hour to two hours.

The following specific embodiments are illustrative only of the broad scope and versatility of the novel invention described herein:

EXAMPLE 1

Prepare a clear solution:
.01 molar in Zn $(C_2H_3O_2)_2$
.005 molar in Si $(OC_2H_5)_4$
.0001 molar in Mn $(C_2H_3O_2)_2$ in a solvent mixture composed of:

| | Percent |
|---|---|
| 1-butanol (percent by volume) | 84 |
| Ethanol | 14 |
| $H_2O$ | 2 |

Prepare by mixing 50 ml. of 0.1 molar zinc acetate in 90% denatured alcohol, 25 ml. of 0.1 molar tetraethylorthosilicate in absolute ethanol, and 5 ml. of 0.01 molar manganese acetate in absolute ethanol, and dilute to 500 ml. with 1-butanol.

The thus-prepared solution is placed in the container 1 of a spray apparatus illustrated in FIG. 6, a positive pressure of about 20 pounds per square inch of filtered air is established at the spray head 4 by adjusting the valve 5, and the solution flow-rate is adjusted to the rate of about 100 ml. per hour and directed onto a heated quartz substrate 8. Throughout the spraying cycle, the hot plate 11 is maintained at a temperature sufficient to provide a temperature of 550±10 degrees Fahrenheit on the sprayed surface of the substrate.

The resulting $Zn_2SiO_4 \cdot Mn$ film produced under these conditions was slightly hazy in appearance and was about three microns thick.

The sprayed film was baked in an air atmosphere for one hour at 1150 degrees Fahrenheit, after which it was found both to be photoluminescent and to exist in the green emitting cathodoluminescent form of $Zn_2SiO_4 \cdot Mn$. Cathodoluminescent properties were measured with samples placed in a demountable cathode-ray tube by bombarding the film with 15 kev. electrons at about 1 microampere/cm.$^2$ current density.

Photoluminescence properties, such as emission spectra, were determined with a Perkin-Elmer Model 99 double-pass monochromator equipped with a suitable photomultiplier (6217). A beam of monochromatic 2537 angstrom light was directed onto the coated film, which was mounted facing the entrance slit of the Perkin-Elmer monochromator. The latter was adjusted to measure the wave-length and the intensity of light emitted by the coated phosphor film when excited by ultraviolet light of 2537 angstroms. The photoluminescent emission spectrum of a $Zn_2SiO_4 \cdot Mn$ film prepared as described above is shown in FIG. 1 as curve 1', and the corresponding spectrum of a prior-art $Zn_2SiO_4 \cdot Mn$ screen prepared by the powder method is shown as curve 2'.

EXAMPLE 2

In a manner similar to Example 1, a luminescent film was prepared by spraying a solution containing the same dissolved compounds, in the same proportions, but with a solvent system consisting of:

| | Percent |
|---|---|
| Acetic acid (percent by volume) | 42 |
| $H_2O$ | 42 |
| Ethanol | 16 |

This solution was sprayed on a quartz substrate and then baked for one hour at 1150 degrees Fahrenheit in an atmosphere of nitrogen in the manner described in Example 1. The $Zn_2SiO_4 \cdot Mn$ film of this example exhibited a green cathodoluminescent color when tested in the demountable cathode-ray tube described above.

EXAMPLE 3

A film was made in the manner shown in Example 1 except that the spray solution was:

.0250 molar in $Zn(C_2H_3O_2)_2$
.0125 molar in $Si(OC_2H_5)_4$
.00025 molar in $Mn(C_2H_3O_2)_2$ in a solvent mixture consisting of:

| | Percent |
|---|---|
| $H_2O$ (percent by volume) | 50 |
| Acetic acid | 50 |

The solution is made up by mixing 500 ml. of .05 molar tetraethylorthosilicate in 100% acetic acid, 500 ml. of 0.1 molar zinc acetate in water, and 50 ml. of 0.01 molar manganese acetate in 50% acetic acid and the whole then made up to 2000 ml. with 50% acetic acid in water.

When this solution was sprayed on a Pyrex substrate maintained at 500 degrees Fahrenheit and then baked for two hours in air at 1380 degrees Fahrenheit, it provided a thin yellow or yellow-green cathodoluminescent film of $Zn_2SiO_4 \cdot Mn$.

EXAMPLE 4

The solution of Example 3 was sprayed onto a Pyrex substrate and onto a quartz substrate at a temperature of 500 degrees Fahrenheit, and each of these was baked in air for two hours at 1200 degrees Fahrenheit to provide a luminescent film. The film on each of these substrates was found to exist in the red emitting cathodoluminescent form of $Zn_2SiO_4 \cdot Mn$.

EXAMPLE 5

In the manner shown in Example 1, a film was prepared by use of a spray solution:

0.0158 molar in $Ca(C_2H_3O_2)_2$
0.015 molar in $(NH_4)_2WO_4$
1.0 molar in $NH_4C_2H_3O_2$
in a solvent consisting of:

3% aqueous ammonia

The solution was made by mixing 52.5 ml. of 0.1 molar $Ca(C_2H_3O_2)_2$ in 10% acetic acid and 100 ml. of 0.05 molar $(NH_4)_2WO_4$ in 15% aqueous ammonia, and the whole was diluted to 333 ml. with 10% acetic acid.

This solution was sprayed in about two hours onto 1" x 3" soft glass microscope slides maintained at about 600 dgeress Fahrenheit by a hot plate. Baking these film samples in air at about 1200 degrees Fahrenheit for one half-hour was sufficient to yield films exhibiting blue photo- and cathodoluminescence characteristic of $CaWO_4$.

EXAMPLE 6

A film was made in the manner shown in Example 1 except that the spray solution was:

0.025 molar in $Mg(C_2H_3O_2)_2$
0.025 molar in $(NH_4)_2WO_4$
2.1 molar in $NH_4C_2H_3O_2$ in a solvent consisting of 4% aqueous ammonia.

The solution was made by mixing 500 ml. of 0.05 molar $Mg(C_2H_3O_2)_2$ in 25% aqueous acetic acid and 500 ml. of 0.05 molar $(NH_4)_2WO_4$ in 15% aqueous ammonia.

About 300 ml. of this solution was sprayed at a rate of about 150 ml./hour onto soft glass microscope slides maintained at about 600 degrees Fahrenheit. These film samples were baked in air at about 1200 degrees Fahrenheit for one half-hour. After this processing, these films exhibited blue-green photo- and cathodoluminescence characteristics of $MgWO_4$.

EXAMPLE 7

A film was made in the manner shown in Example 1 except that the spray solution was:

0.0158 molar in $Cd(C_2H_3O_2)_2$
0.015 molar in $(NH_4)_2WO_4$
0.18 molar in $NH_4C_2H_3O_2$ in a solvent consisting of 3% aqueous ammonia.

The solution was made by mixing 100 ml. of 0.05 molar $(NH_4)_2WO_4$ in 15% aqueous ammonia and 105 ml. of 0.05 molar $Cd(C_2H_3O_2)_2$ in 10% aqueous acetic acid, and the whole was diluted to 333 ml. with distilled water.

This solution was sprayed in about two hours onto 1" x 3" soft glass microscope slides maintained at about 700 degrees Fahrenheit by a hot plate. Baking these film samples in air at about 1200 degrees Fahrenheit for one half-hour or more yielded films which exhibit whitish-blue luminescence when excited by 2537 angstrom ultraviolet light or by an electron beam.

The spectral emission curve determined for these $CdWO_4$ sprayed films is shown as curve 1' in FIG. 2. The corresponding spectral emission of a prior-art $CdWO_4$ prepared by the powder method is shown as curve 2'.

The above $CdWO_4$ sprayed films were examined by X-ray diffraction, and the X-ray diffraction pattern obtained is shown in FIG. 4. An X-ray diffraction pattern obtained for $CdWO_4$ powder is shown in FIG. 5.

EXAMPLE 8

A film was made in the manner shown in Example 1 except that the spray solution was:

0.0263 molar in $Zn(C_2H_3O_2)_2$
0.0133 molar in $GeO_2$
0.000264 molar in $Mn(C_2H_3O_2)_2$
3.5 molar in $NH_4C_2H_3O_2$ dissolved in an aqueous solution containing enough acetic acid to give a pH of 5.2.

The solution was made by mixing 462 ml. of 0.05 molar $GeO_2$ in 1.2% aqueous tetramethylammonium hydroxide and 456 ml. of 0.1 molar $Zn(C_2H_3O_2)_2$ in water that is first diluted with 400 ml. of 29% aqueous ammonia. To this solution are added 45.5 ml. of $Mn(C_2H_3O_2)_2$ and 400 ml. of glacial acetic acid.

Three hundred milliliters of this solution was sprayed onto soft glass substrates with the hot plate at 800 degrees Fahrenheit. The films were quite transparent both before and after heat treatment. After a heat treatment in air for about one hour at 1100 degrees Fahrenheit, the films exhibited a yellow-green cathodoluminescence characteristic of $Zn_2GeO_4 \cdot Mn$.

EXAMPLE 9

Films were made in the manner shown in Example 1 except that the spray solution was:

0.0244 molar in $Cd(C_2H_3O_2)_2$
0.0244 molar in $H_3BO_3$
0.000148 molar in $Mn(C_2H_3O_2)_2$ in a solvent consisting of 1% aqueous acetic acid.

The solution was made by mixing 1,000 ml. of 0.05 molar $Cd(C_2H_3O_2)_2$ in water, 1,000 ml. of 0.05 molar $H_3BO_3$ in water, and 30 ml. of 0.01 molar $Mn(C_2H_3O_2)_2$ in 50% aqueous acetic acid.

Films were prepared by spraying 300 ml. of this soluon onto soft glass substrates with the hot plate at 800 degrees Fahrenheit and another 300 ml. on additional substrates with the hot plate at 600 degrees Fahrenheit. The films were frosty and yellow, with some black appearing in the samples sprayed at the lower temperature. After a one-hour heat treatment in air at 1100 degrees Fahrenheit, the films from both of the above sprays were white and exhibited an orange-red cathodoluminescence charactertistic of $Cd_2B_2O_5 \cdot Mn$.

EXAMPLE 10

Films were made in the manner shown in Example 1 except that the spray solution was:

0.0268 molar in $Zn(C_2H_3O_2)_2$
0.036 molar in $H_3BO_3$
0.000161 molar in $Mn(C_2H_3O_2)_2$ in a solvent consisting of 1.3% aqueous acetic acid.

The solution is made by mixing 500 ml. of 0.1 molar $Zn(C_2H_3O_2)_2$ in 2% aqueous acetic acid, 1,333 ml. of 0.0503 molar $H_3BO_3$ in water, and 30 ml. of 0.01 molar $Mn(C_2H_3O_2)_2$ in 50% acetic acid.

Films were prepared by spraying 400 ml. of this solution onto soft glass substrates with the hot plate at 750 degrees Fahrenheit. After a one-hour heat treatment in air at 1200 degrees Fahrenheit, these films exhibited cathodoluminescence characteristic of $Zn_3B_4O_4 \cdot Mn$. The luminescent color of the resultant films can be varied from yellow-green to yellow by changing the $Zn(C_2H_3O_2)_2$-to-$H_3BO_3$ ratio used in the spray solution.

EXAMPLE 11

Films were made in the manner shown in Example 1 except that the spray solution was:

0.0375 molar in $Zn(C_2H_3O_2)_2$
0.02 molar in $(NH_4)_2HPO_4$
0.00018 molar in $Mn(C_2H_3O_2)_2$ in a solvent consisting of 9.5% aqueous acetic acid.

The solution is made by diluting 500 ml. of 0.1 molar $(NH_4)_2HPO_4$ with 1,000 ml. of water and 200 ml. of glacial acetic acid. To this are added 750 ml. of 0.1 molar $Zn(C_2H_3O_2)_2$ and 45 ml. of 0.01 molar $Mn(C_2H_3O_2)_2$.

Three hundred milliliters of this solution, designed to yield $Zn_3(PO_4)_2 \cdot Mn$, was sprayed onto soft glass substrates with the hot plate at 700 degrees Fahrenheit. The resultant films were frosty in appearance and exhibited a red cathodoluminescence. Heat treatment of these films at 1200 degrees Fahrenheit in air for one-half-hour decreased the luminescence efficiency and shifted the color of the luminescence toward the yellow.

EXAMPLE 12

Films were prepared in a manner similar to Example 1 except that the spray solution was:

0.05 molar in $CdSO_4$
0.00153 molar in $Mn(C_2H_3O_2)_2$ in a solvent consisting of 1.5% aqueous acetic acid.

This solution was prepared by mixing 500 ml. of 0.1 molar $CdSO_4$ in water and 30 ml. of 0.05 molar $Mn(S_2H_3O_2)_2$ in 50% acetic acid and diluting to one liter with water.

Two types of films and two luminiescent colors were obtained with this solution, designed to yield $CdSO_4$:Mn. Low substrate temperature (350 degrees Fahrenheit) during spray and low heat treatment temperature (1000 degrees Fahrenheit) yielded frosty films having yellow-green luminescence. Higher substrate temperature (700 degrees Fahrenheit) and higher heat treatment temperature (1200 degrees Fahrenheit) favored the formation of glassy films exhibiting a red luminescence.

EXAMPLE 13

Films were made in the manner shown in Example 1 except that the spray solution was:

0.02 molar in $Cd(C_2H_3O_2)_2$
0.02 molar in $(NH_4)_2HPO_4$
0.00018 molar in $Mn(C_2H_3O_2)_2$ in a solvent consisting of 10% aqueous acetic acid.

The solution was made by first taking 250 ml. of 0.1 molar $(NH_4)_2HPO_4$ in water and diluting with 365 ml. of water, and 100 ml. of 100% acetic acid. To this solution was added 512 ml. of 0.0488 molar $Cd(C_2H_3O_2)_2$ in 2.5% acetic acid, followed by 22.5 ml. of 0.01 molar $Mn(C_2H_3O_2)_2$ in 50% acetic acid.

Films were prepared by spraying 300 ml. of this solution onto soft glass substrates with the hot plate at 500 degrees Fahrenheit. After being baked for one hour in air at 1100 degrees Fahrenheit, these films exhibited the red cathodoluminescence characteristic of $Cd_2P_2O_7$:Mn.

EXAMPLE 14

Films were made in the manner shown in Example 1 except that the spray solution was:

0.0125 molar in $BaC_2H_3O_2$
0.0125 molar in $(n\text{-}C_4H_9O)_4Ti$ in a solvent consisting of 40% aqueous acetic acid.

This solution was prepared by adding one liter of a milky suspension of 17.02 grams of tetrabutyl titanate in 100% acetic acid to one liter of 0.05 molar barium acetate solution (in 80% acetic acid) with stirring. The resultant hazy solution is diluted to four liters with water to give a clear spray solution.

Films were prepared by spraying 300 ml. of this solution at the rate of 160 ml. per hour onto quartz substrates maintained at a temperature of 350 degrees Fahrenheit. These coated substrates were then placed film-to-film and heat-treated in air for one hour at 1470 degrees Fahrenheit. X-ray diffraction studies of sprayed films processed in this manner identified the material to be $BaTiO_3$.

EXAMPLE 15

Films were made in the manner shown in Example 1 except that the spray solution was:

0.06 molar in $Zn(C_2H_3O_2)_2$
0.04 molar in $NH_4VO_3$ in a solvent consisting of 1.2% aqueous acetic acid.

The solution is made by adding 500 ml. of 0.1 molar $NH_4VO_3$ in water to 750 ml. of 0.1 molar $Zn(C_2H_3O_2)_2$ in 2% acetic acid.

Best luminescent results with this solution were obtained by spraying 300 ml. onto soft glass substrates with the hot plate at 350 degrees Fahrenheit and then baking the resultant films in an oxygen atmosphere for one hour at 1200 degrees Fahrenheit. These films exhibited a greenish-yellow cathodoluminescence characteristic of $Zn_3V_2O_8$.

EXAMPLE 16

Films were made in the manner shown in Example 1 except that the spray solution was:

0.049 molar in $Ca(C_2H_3O_2)_2$
0.0055 molar in $CaCl_2$
0.0337 molar in $(NH_4)_2HPO_4$
0.0012 molar in $Mn(C_2H_3O_2)_2$ in a solvent consisting of 100% aqueous acetic acid.

The solution was made by mixing 900 ml. of 0.1 molar calcium acetate (in 10% acetic acid), 100 ml. of 0.1 molar calcium chloride, 618 ml. of 0.1 molar diammonium acid phosphate, and 217 ml. of manganous acetate (in 50% acetic acid).

Films were prepared by spraying about 300 ml. of this solution (designed to yield $3Ca_3(PO_4)_2 \cdot CaCl_2$:Mn) onto glass substrates with the hot plate temperature at 700 degrees Fahrenheit. A clear deposit was formed, which exhibited cathodoluminescence varying in color from yellow to red after heat treatment in air for one hour at 1200 degrees Fahrenheit.

EXAMPLE 17

Films were made in the manner shown in Example 1 except that the spray solution was:

0.03 molar in Ca $(C_2H_3O_2)_2$
0.02 molar in $(NH_4)_2HPO_4$
0.001 molar in $Ce(NO_3)_3$ in a solvent consisting of 30% aqueous acetic acid.

This solution was made by mixing 750 ml. of 0.1 molar $Ca(C_2H_3O_2)_2$, 500 ml. of 0.1 molar $(NH_4)_2HPO_4$, and 650 ml. of acetic acid. To this is added 63 ml. of 0.01 molar $Ce(NO_3)_3$. This solution appears cloudy but may be sprayed without difficulty.

Films were prepared by spraying 200 ml. of this solution onto quartz substrates maintained at 600 degrees Fahrenheit. These films, when heat-treated film-to-film at 2280 degrees Fahrenheit in nitrogen for 30 minutes, exhibited ultraviolet cathodoluminescence with a spectral emission characteristic of $Ca_3(PO_4)_2$:Ce.

EXAMPLE 18

Films were made in the manner shown in Example 1 except that the spray solution was:

0.02 molar in $Si(OC_2H_5)_4$
0.02 molar in $Ca(C_2H_3O_2)_2$
0.01 molar in $Mg(C_2H_3O_2)_2$
0.0005 molar in $Ce(NO_3)_3$ in a solvent consisting of 12% aqueous acetic acid.

This solution was made by mixing 100 ml. of 0.2 molar $Si(C_2H_5O)_4$ in 50% acetic acid, 200 ml. of 0.05 molar $Mg(C_2H_3O_2)_2$ in 25% acetic acid, 200 ml. of 0.1 molar $Ca(C_2H_3O_2)_2$ in acetic acid, and 50 ml. of 0.01 molar $Ce(NO_3)_3$, and finally diluting to 1.0 liter with water.

Films were prepared by spraying 250 ml. of this solution onto quartz substrates with the hot plate temperature at 650 degrees Fahrenheit. These samples were placed film-to-film and heat-treated in nitrogen at 2280 degrees Fahrenheit for thirty minutes. These films then exhibited ultraviolet cathodoluminescence similar to that reported for $Ca_2MgSi_2O_7$:Ce. The spectral emission curve determined for these sprayed films is shown as curve 1' in FIG. 3. The emission spectra for $Ca_2MgSi_2O_7$:Ce (P–16) prepared by a prior-art powder method is shown as curve 2' in FIG. 3.

EXAMPLE 19

Films were made in the manner shown in Example 1 except that the spray solution was:

0.023 molar in $Ba(CH_3SO_4)_2$
0.0024 molar in $Pb(CH_3SO_4)_2$ in a solvent consisting of water and a small amount of methanol (about 3%).

This solution is made by the following procedure. Concentrated sulfuric acid (7.3 grams) is added slowly with stirring to 100 ml. of absolute methanol. Most of the excess methanol is removed by distillation by slowly heating to 170 degrees Fahrenheit. The resulting solution is cooled to about 115 degrees Fahrenheit and then diluted to 450 ml. with water. To this solution is added, with stirring, a mixture of 6.63 grams of barium carbonate and 1.0 gram of lead carbonate. This mixture is diluted to 1.5 liters and filtered.

Two hundred milliliters of this solution was sprayed onto quartz substrates maintained at 600 degrees Fahrenheit. The resultant deposits were heat-treated film-to-film for fifteen minutes in air at 1200 degrees Fahrenheit. The sprayed $BaSO_4$:Pb films processed in this manner exhibited ultraviolet cathodoluminescence with an emission peak at 3350 angstroms.

What is claimed is:

1. A process for making an oxygen-containing, thin $BaTiO_3$ film on a heat-resistant substrate comprising:
(a) heating the substrate to a temperature between 350° F. and 850° F.;
(b) spraying onto said substrate an aqueous solution containing:
(1) from .01 to .10 molar $BaC_2H_3O_2$ as the source of barium, and
(2) from .005 to .10 molar $Ti(n\text{-}C_4H_9O)_4$ as the source of titanate, said solution containing 40% acetic acid; and
(c) post heat-treating the sprayed film from 10 minutes to 8 hours at temperatures ranging from 1000° F. to 2500° F.

2. A process for making an oxygen-containing, thin $CaWO_4$ luminescent phosphor film on a heat-resistant substrate comprising:
(a) heating the substrate to a temperature between 350° F. and 850° F.;
(b) spraying onto said substrate an aqueous ammonia solution containing:
(1) from .01 to .10 molar $Ca(C_2H_3O_2)_2$ as the course of calcium and
(2) from .005 to .10 molar $(NH_4)_2WO_4$ as the source of tungstate, and
(c) post heat-treating the sprayed film from 10 minutes to 8 hours at temperatures ranging from 1000° F. to 2500° F.

3. A process for making an oxygen-containing, thin $MgWO_4$ luminescent phosphor film on a heat-resistant substrate comprising:
(a) heating the substrate to a temperature between 350° F. and 850° F.;
(b) spraying onto said substrate an aqueous ammonia solution containing:
(1) from .01 to 10 molar $Mg(C_2H_3O_2)_2$ as the source of magnesium,
(2) from .005 to .10 molar $(NH_4)_2WO_4$ as the source of tungstate, and
(c) post heat-treating the sprayed film from 10 minutes to 8 hours at temperatures ranging from 1000° F. to 2500° F.

4. A process for making an oxygen-containing, thin $CdWO_4$ luminescent phosphor film on a heat-resistant substrate comprising:
(a) heating the substrate to a temperature between 350° F. and 850° F.;
(b) spraying onto said substrate an aqueous ammonia solution containing:
(1) from .01 to .10 molar $Cd(C_2H_3O_2)_2$ as the source of cadmium and
(2) from .005 to .10 molar $(NH_4)_2WO_4$ as the source of tungstate, and
(c) post heat-treating the sprayed film from 10 minutes to 8 hours at temperatures ranging from 1000° F. to 2500° F.

5. A process for making an oxygen-containing, thin $Zn_3V_2O_8$ luminescent phosphor film on a heat-resistant substrate comprising:
(a) heating the substrate to a temperature between 350° F. and 850° F.;
(b) spraying onto said substrate an aqueous acetic acid solution containing:
(1) from .01 to .10 molar $Zn(C_2H_3O_2)_2$ as the source of zinc, and
(2) from .005 to .10 molar $NH_4VO_3$ as the source of vanadate, and
(c) post heat-treating the sprayed film from 10 minutes to 8 hours at temperatures ranging from 1000° F. to 2500° F.

6. A spray process for making an oxygen-containing, luminescent $Zn_2GeO_4$:Mn phosphor film comprising:
(a) heating said substrate to a temperature ranging from 350° F. to 850° F.
(b) spraying onto said heated substrate an aqueous acetic acid solution containing:
(1) from .01 to .10 molar $Zn(C_2H_3O_2)_2$ as the source of zinc,
(2) from .005 to .10 molar $GeO_2$ as the source of germanate, and
(3) from .0001 to .003 molar $Mn(C_2H_3O_2)_2$ as the source of manganese, and
(c) post heat-treating the sprayed film from 10 minutes to 8 hours at temperatures ranging from 1000° F. to 2500° F.

7. A spray process for making an oxygen-containing, luminescent $Cd_2B_2O_5$:Mn phosphor film comprising:
(a) heating said substrate to a temperature ranging from 350° F. to 850° F.;
(b) spraying onto said heated substrate an aqueous acetic acid solution containing:
(1) from .01 to .10 molar $Cd(C_2H_3O_2)_2$ as the source of cadmium,
(2) from .005 to .10 molar $H_3BO_3$ as the source of borate, and
(3) from .0001 to .003 molar $Mn(C_2H_3O_2)_2$ as the source of manganese, and
(c) post heat-treating the sprayed film from 10 minutes to 8 hours at temperatures ranging from 1000° F. to 2500° F.

8. A spray process for making an oxygen-containing, luminescent $Zn_3B_4O_4$:Mn phosphor film comprising:
(a) heating said substrate to a temperature ranging from 350° F. to 850° F.;
(b) spraying onto said heated substrate an aqueous acetic acid solution containing:
(1) from .01 to .10 molar $Zn(C_2H_3O_2)_2$ as the source of zinc,
(2) from .005 to .10 molar $H_3BO_3$ as the source of borate, and
(3) from .0001 to .003 molar $Mn(C_2H_3O_2)_2$ as the source of manganese, and
(c) post heat-treating the sprayed film from 10 minutes to 8 hours at temperatures ranging from 1000° F. to 2500° F.

9. A spray process for making an oxygen-containing, luminescent $Zn_3(PO_4)_2$:Mn phosphor film comprising:
(a) heating said substrate to a temperature ranging from 350° F. to 850° F.;
(b) spraying onto said heated substrate an aqueous acetic acid solution containing:
(1) from .01 to .10 molar $Zn(C_2H_3O_2)_2$ as the source of zinc,
(2) from .005 to .10 molar $(NH_4)_2HPO_4$ as the source of phosphate, and
(3) from .0001 to .003 molar $Mn(C_2H_3O_2)_2$ as the source of manganese, and
(c) post heat-treating the sprayed film from 10 minutes to 8 hours at temperatures ranging from 1000° F. to 2500° F.

10. A spray process for making an oxygen-containing, luminescent $CdSO_4$:Mn phosphor film comprising:
(a) heating said substrate to a temperature ranging from 350° F. to 850° F.;
(b) spraying onto said heated substrate an aqueous acetic acid solution containing:
(1) from .015 to .20 molar $CdSO_4$ as the combined source of cadmium and sulfate, and
(2) from .0001 to .003 molar $Mn(C_2H_3O_2)_2$ as the source of manganese, and
(c) post heat-treating the sprayed film from 10 minutes to 8 hours at temperatures ranging from 1000° F. to 2500° F.

11. A spray process for making an oxygen-containing, luminescent $Cd_2P_2O_7$:Mn phosphor film comprising:
(a) heating said substrate to a temperature ranging from 350° F. to 850° F.;
(b) spraying onto said heated substrate an aqueous acetic acid solution containing:
(1) from .01 to .10 molar $Cd(C_2H_3O_2)_2$ as the source of cadmium,
(2) from .005 to .10 molar $(NH_4)_2HPO_4$ as the source of phosphate, and
(3) from .0001 to .003 molar $Mn(C_2H_3O_2)_2$ as the source of manganese, and
(c) post heat-treating the sprayed film from 10 minutes to 8 hours at temperatures ranging from 1000° F. to 2500° F.

12. A spray process for making an oxygen-containing, luminescent $3Ca_3(PO_4)_2 \cdot CaCl_2$:Mn phosphor film comprising:
(a) heating said substrate to a temperature ranging from 350° F. to 850° F.;
(b) spraying onto said heated substrate an aqueous acetic acid solution containing:
(1) from .01 to .10 molar $Ca(C_2H_3O_2)_2$ and $CaCl_2$ as the sources of calcium;
(2) from .005 to .10 molar $(NH_4)_2HPO_4$ as the source of phosphate, and
(3) from .0001 to .003 molar $Mn(C_2H_3O_2)_2$ as the source of manganese, and
(c) post heat-treating the sprayed film from 10 minutes to 8 hours at temperatures ranging from 1000° F. to 2500° F.

13. A spray process for making an oxygen-containing, luminescent $Ca_3(PO_4)_2$:Ce phosphor film comprising:
(a) heating said substrate to a temperature ranging from 350° F. to 850° F.;
(b) spraying onto said heated substrate an aqueous acetic acid solution containing:
(1) from .01 to .10 molar $Ca(C_2H_3O_2)_2$ as the source of calcium,
(2) from .005 to .10 molar $(NH_4)_2HPO_4$ as the source of phosphate, and
(3) from .0001 to .003 molar $Ce(NO_3)_3$ as the source of cerium, and
(c) post heat-treating the sprayed film from 10 minutes to 8 hours at temperatures ranging from 1000° F. to 2500° F.

14. A spray process for making an oxygen-containing, luminescent $Ca_2MgSi_2O_7$:Ce phosphor film comprising:
(a) heating said substrate to a temperature ranging from 350° F. to 850° F.;
(b) spraying onto said heated substrate an aqueous acetic acid solution containing:
(1) from .01 to .10 molar $Ca(C_2H_3O_2)_2$ and $Mg(C_2H_3O_2)_2$ as the sources of calcium and magnesium,
(2) from .005 to .10 molar $Si(OC_2H_5)_4$ as the source of silicate, and
(3) from .0001 to .003 molar $Ce(NO_3)_3$ as the source of cerium, and
(c) post heat-treating the sprayed film from 10 minutes to 8 hours at temperatures ranging from 1000° F. to 2500° F.

15. A spray process for making a $BaSO_4$:Pb luminescent film adherently deposited on a heat-resistant substrate, said film comprising a cation moiety, an anion moiety which includes oxygen, and an activator moiety, the process comprising:
(a) heating said substrate to a temperature ranging from 350 degrees Fahrenheit to 850 degrees Fahrenheit,
(b) spraying onto said heated substrate an aqueous solution containing
(1) .01–.1 molar $Ba(CH_3SO_4)_2$ and
(2) .001–.01 molar $Pb(CH_3SO_4)_2$,
(c) and post-heat-treating the sprayed film from ten minutes to eight hours at a temperature ranging from 1000 degrees Fahrenheit to 2500 degrees Fahrenheit.

16. A spray composition adapted for making a thin $BaTiO_3$ film by spraying the said composition on a substrate heated between 350 degrees Fahrenheit and 850 degrees Fahrenheit, consisting of:
(1) $Ba(C_2H_3O_2)_2$ in a concentration ranging from .01 molar to .1 molar, and
(2) $(n\text{-}C_4H_9O)_4$ Ti in a concentration ranging from .01 molar to .1 molar
dissolved in 40% aqueous acetic acid.

17. A spray composition adapted for making a $MgWO_4$ thin luminescent film consisting of:
(1) .01–.1 molar $Mg(C_2H_3O_2)_2$,
(2) .005–.1 molar $(NH_4)_2WO_4$, and
(3) 2.1 molar $NH_4C_2H_3O_2$
dissolved in 4% aqueous ammonia.

18. A spray composition adapted for making a $CdWO_4$ thin luminescent film consisting of:
(1) .01–.1 molar $Cd(C_2H_3O_2)_2$,
(2) .005–.1 molar $(NH_4)_2WO_4$, and
(3) .18 molar $NH_4C_2H_3O_2$
dissolved in 3% aqueous ammonia.

19. An aqueous spray composition adapted for making a $BaSO_4$:Pb thin luminescent film consisting of:
(a) .01 to .05 molar $Ba(CH_3SO_4)_2$ and
(b) .001 to .005 molar $Pb(CH_3SO_4)_2$
dissolved in water and a small amount of methanol.

References Cited

UNITED STATES PATENTS

| | | | |
|---|---|---|---|
| 3,002,861 | 10/1961 | Suchoff | 117—221 XR |
| 2,325,110 | 7/1943 | Colborne | 252—301.4 X |
| 2,996,404 | 8/1961 | Feldman. | |
| 2,998,323 | 8/1961 | Feldman. | |
| 3,148,084 | 9/1964 | Hill et al. | |
| 3,195,004 | 7/1965 | Hassett | 117—217 X |
| 3,202,054 | 8/1965 | Mochel | 117—33.3 X |

DAVID KLEIN, Primary Examiner

U.S. Cl. X.R.

117—221; 252—301.4, 301.5, 301.6

UNITED STATES PATENT OFFICE

CERTIFICATE OF CORRECTION

Patent No. 3,494,779 Dated: February 10, 1970

Inventor: Joseph A. Pappalardo et al.

It is certified that error appears in the above-identified patent and that said Letters Patent are hereby corrected as shown below:

Column 4, line 52, "V-A" (second occurrence), should be ---VI-A---.
Column 8, line 12, "and" should be ---the---.
Column 11, line 67, "$Mn(S_2H_3O_2)_2$" should be ---$Mn(C_2H_3O_2)_2$---.
Column 14, line 40 (Claim 3), "10" should be ---.10---.

SIGNED AND SEALED
JUL 7 1970

(SEAL)
Attest:

Edward M. Fletcher, Jr.
Attesting Officer

WILLIAM E. SCHUYLER, JR.
Commissioner of Patents